(12) United States Patent
Beadle et al.

(10) Patent No.: US 7,415,082 B2
(45) Date of Patent: Aug. 19, 2008

(54) RECEIVER INCLUDING SYNCH PULSE DETECTION AND ASSOCIATED METHOD

(75) Inventors: Edward R. Beadle, Melbourne, FL (US); John F. Dishman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 690 days.

(21) Appl. No.: 11/141,441

(22) Filed: May 31, 2005

(65) Prior Publication Data

US 2006/0269027 A1    Nov. 30, 2006

(51) Int. Cl.
H04L 27/06    (2006.01)
H04L 7/06     (2006.01)
H04B 1/713    (2006.01)

(52) U.S. Cl. .................. 375/343; 375/362; 375/137
(58) Field of Classification Search .............. 375/130, 375/136, 132–134, 146, 143, 145, 150, 343, 375/152, 340, 354, 362–368; 370/504, 509–515
See application file for complete search history.

(56) References Cited

U.S. PATENT DOCUMENTS

| | | | |
|---|---|---|---|
| 4,224,679 A | 9/1980 | Nossen et al. | 364/728 |
| 4,899,159 A | 2/1990 | Marchant | 342/90 |
| 4,970,660 A | 11/1990 | Marchant | 364/517 |
| 5,506,863 A | 4/1996 | Meidan et al. | 375/202 |
| 5,694,388 A * | 12/1997 | Sawahashi et al. | 370/206 |
| 5,757,845 A * | 5/1998 | Fukawa et al. | 375/152 |
| 6,226,321 B1 | 5/2001 | Michels et al. | 375/227 |
| 6,400,751 B1 | 6/2002 | Rodgers | 375/132 |
| 6,757,323 B1 | 6/2004 | Fleming et al. | 375/142 |
| 6,757,546 B1 | 6/2004 | Hagen et al. | 455/502 |
| 2006/0269017 A1* | 11/2006 | Beadle et al. | 375/343 |

* cited by examiner

*Primary Examiner*—Tesfaldet Bocure
(74) *Attorney, Agent, or Firm*—Allen Dyer Doppelt Milbrath & Gilchrist

(57) ABSTRACT

A receiver includes a matched filter matched to a synch pulse and generates a matched filter output signal having peaks and valleys with one of the peaks corresponding to the synch pulse. An orthogonal filter is inversely matched to the synch pulse and generates an orthogonal filter output signal having peaks and valleys with one of the valleys corresponding to the synch pulse. A detector determines the synch pulse based upon a largest difference between the matched filter output signal and the orthogonal filter output signal.

23 Claims, 7 Drawing Sheets

RECEIVER INCLUDING SYNCH PULSE DETECTION AND ASSOCIATED METHOD

GOVERNMENT LICENSE RIGHTS

This invention was made with Government support under contract No. AEHF-NMT N00039-04-C-0011 awarded by the United States Navy. The Government has certain rights in this invention.

FIELD OF THE INVENTION

The present invention relates to the field of communication systems, and more particularly, to a receiver using various filters for synch pulse detection and related methods.

BACKGROUND OF THE INVENTION

Frequency hopping is a commonly used technique for providing secure communication systems. A frequency hopping communication system is a type of spread spectrum system in which a wideband signal is generated by hopping from one frequency to another over a large number of frequency choices. In systems using very fast frequency hopping, the signal is transmitted at each frequency for a very short period, such as 20 ms, for example.

Transmission of frequency hopped signals include synch pulses and data pulses. The synch pulses allow a receiver to accurately adjust its local time to match the local time of the transmitter. For asynchronous communication systems, the hop pattern of the synch pulses is determined by the receiver before its clock can be adjusted. Once the hop pattern is determined, then the time-of-day can be extracted. The receiver typically uses non-coherent processing to perform time-of-arrival (toa) estimates on the synch pulses. The shape of the synch pulses is known, but the phase, carrier/offset frequency and timing are not known.

One approach is to use a matched filter for detecting the synch pulses. The matched filter operates based upon detecting the known shape of the synch pulses. Even though matched filters are straightforward to implement, there are several limitations. These limitations include signal-to-noise losses due to the frequency uncertainty of the synch pulses, and setting a noise-only threshold can be difficult when balancing the probability-of-detection (pod) to the probability-of-false alarms (pfa). In addition, time-of-arrival estimates of the synch pulses are based upon peak signal outputs. Since the synch pulses are typically at power levels lower than power levels of the data pulses, jammer or high noise level interference can mask the synch pulses, which in turn affects performance of the match filters.

Another approach for detecting the synch pulses is to use constant false alarm rate (CFAR) detectors. CFAR detectors maintain a fixed false alarm rate in the presence of changing interference levels. There are several different types of CFAR detectors, including cell-averaging (CA-CFAR), ordered-statistics (OS-CFAR), greatest-of (GO-CFAR) and censored (C-CFAR). A limitation of CFAR detectors is also with respect to a masking of the synch pulses due to threshold levels typically being higher than necessary, thus resulting in a reduced probability-of-detection.

Example receivers performing code synchronization using either matched filters or CFAR detectors are disclosed in several U.S. patents, such as U.S. Pat. No. 4,224,679; U.S. Pat. No. 6,757,546; U.S. Pat. No. 6,757,323; U.S. Pat. No. 6,226,321; U.S. Pat. No. 4,899,159; and U.S. Pat. No. 4,970,660.

As with matched filters, the need for increased threshold levels for CFAR detectors is due to inaccuracies in non-homogenous environments affected by antenna gain/noise temperature (G/T) variations and jammers. In addition, the signals containing the synch pulses may also fade in and out due to irregularities in the atmospheres. All of these factors contribute to decreasing the probability of an asynchronous receiver detecting received synch pulses.

SUMMARY OF THE INVENTION

In view of the foregoing background, it is therefore an object of the present invention to increase the probability of an asynchronous receiver detecting received synch pulses.

This and other objects, features, and advantages in accordance with the present invention are provided by a receiver comprising a matched filter being matched to a synch pulse and generating a matched filter output signal comprising a plurality of peaks and valleys with one of the peaks corresponding to the synch pulse, and an orthogonal filter being inversely matched to the synch pulse and generating an orthogonal filter output signal comprising a plurality of peaks and valleys with one of the valleys corresponding to the synch pulse.

A detector determines the synch pulse based upon the matched filter output signal and the orthogonal filter output signal. In particular, the detector may determine the synch pulse based upon a largest difference between the matched filter output signal and the orthogonal filter output signal.

The matched filter and the orthogonal filter may have inputs coupled in parallel for receiving an input signal comprising a plurality of data pulses and a plurality of synch pulses. The input signal may be frequency hopped.

The input signal may comprise $N_p$ data frames, with $N_p$ being greater than 1. The receiver may further comprise a first non-coherent integrator coupled to an output of the matched filter for non-coherently integrating samples accumulated by the matched filter over the $N_p$ data frames, and a second non-coherent integrator coupled to an output of the orthogonal filter for non-coherently integrating samples accumulated by the orthogonal filter over the $N_p$ data frames.

The receiver may further comprising a constant false alarm rate (CFAR) detector coupled to an output of the first non-coherent integrator for comparing the non-coherently integrated samples accumulated by the matched filter over the $N_p$ data frames to a noise threshold. The receiver may further comprise a noise estimator coupled to the CFAR detector for setting the noise threshold based upon the input signal.

The noise estimator may comprise an ordered-statistic CFAR detector and sets the noise threshold for the $N_p$ data frames by determining a first variance of the plurality of synch and data pulses within the $N_p$ data frames, and removing pulses exceeding a first variance threshold. A second variance on the plurality of synch and data pulses not exceeding the first variance threshold is determined, and pulses exceeding a second variance threshold are removed. The noise threshold is set based upon a remaining input signal for the $N_p$ data frames after removal of pulses exceeding the first and second variance thresholds.

Another aspect of the invention is directed to a method for detecting a synch pulse in a receiver comprising a matched filter matched to the synch pulse and an orthogonal filter inversely matched to the synch pulse. The method comprises generating a matched filter output signal comprising a plurality of peaks and valleys with one of the peaks corresponding to the synch pulse, and generating an orthogonal filter output signal comprising a plurality of peaks and valleys with one of the valleys corresponding to the synch pulse. The synch pulse is detected based upon the matched filter output signal and the orthogonal filter output signal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
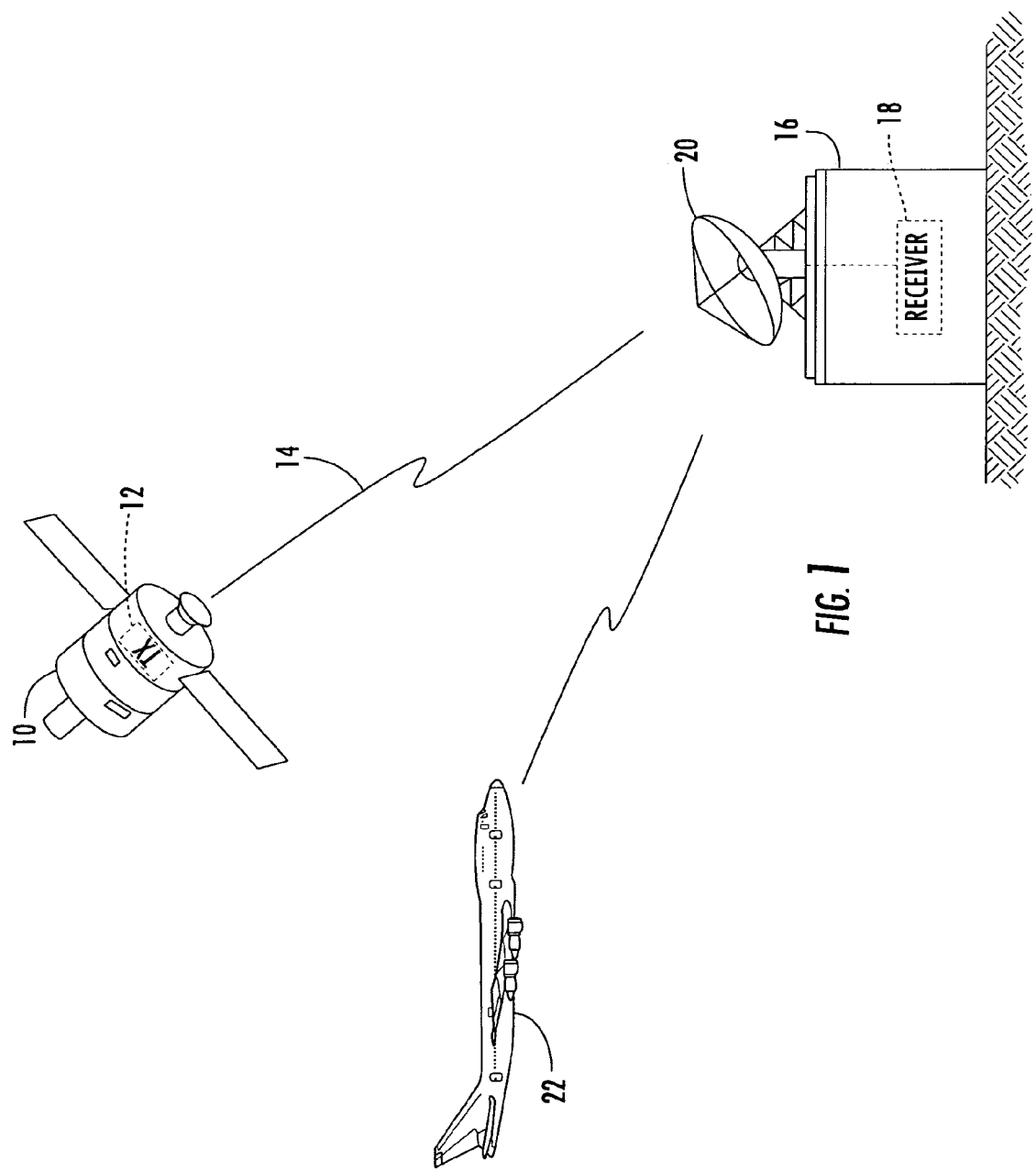
FIG. 1 is a schematic system diagram illustrating a ground-based receiver receiving signals from a satellite in accordance with the present invention.

For purposes of discussing the present invention, a satellite 10 having a transmitter 12 transmits signals 14 to a ground station 16, as illustrated in FIG. 1. A receiver 18 in the ground station 16 receives the transmitted signals 14 via antenna 20. The transmitted signals 14 include data pulses and synch pulses, which may be time and frequency hopped to reduce the probability of being detected by an undesired receiver. Frequency hopping also reduces the receiver's 18 susceptibility to co-channel interference and jamming. The jamming may be intentional, such as from an airborne jammer 22, for example.

The satellite 10 and the receiver 18 are initially not synchronized, in that they each have their respective clocks. For the receiver 18 to acquire and track the time and frequency hopped signals, the receiver needs to adjust or set its clock to match the clock of the satellite 10. This is accomplished by performing time-of-arrival estimates on the detected synch pulses. The receiver 18 has coarse knowledge of the expected TOA of a sync pulse on a particular frequency channel. To synchronize the clocks, which is necessary for data recovery, the receiver 18 uses a "hop and dwell" strategy. In this strategy, the receiver hops to the next frequency channel expected to contain a sync pulse, such that if the local receiver clock is matched to the transmit clock the sync pulse arrives at zero relative offset (e.g., mid-dwell). Typically, the receiver clock is not aligned with the transmitter so the offset from mid-dwell indicates the clock adjustment required in the receiver. Then its time may be adjusted accordingly.

Even though the illustrated example is based upon satellite communications and a fixed ground-based receiver, the scheme is relevant to a plurality of fixed or mobile transmitter/receiver pairings as well as to different frequency bands, as readily appreciated by those skilled in the art. In fact, the transmitted signals 14 do not have to be frequency hopped. However, the receiver 18 is an asynchronous receiver detecting the synch pulses for performing time-of-arrival estimates in order to accurately adjust its local time to match the local time of the transmitter 12.

The illustrated platforms 10, 16 are not limited to an air-to-ground configuration. For instance, the satellite 10 may be another type of airborne platform, such as an aircraft, and the ground-based unit 16 may be a mobile platform, such as a ship or vehicle. In addition to the air-to-ground configuration, the platforms 10, 16 may also be of the type to communicate in air-to-air or ground-to-ground configurations.

As will be discussed in greater detail below, non-coherent processing is used by the receiver 18 to evaluate space-time-frequency hypotheses for acquiring and tracking the synch pulses embedded with the data pulses in the signals 14 transmitted by the satellite 10. The spatial dimension is encountered when the receiving terminal must scan a volume greater than its field of view. This is typical when the antenna has gain and there exists significant spatial uncertainty regarding the location of the transmitter. Thus the time/frequency search must be repeated for each spatial "cell" or "hypothesis". The acquisition and tracking performance is affected by a number of factors. For instance, the number of space-time-frequency hypotheses to evaluate affects the probability of the synch pulses being acquired and tracked because the probability of at least one false detection grows expotentially. The type of aperture used by the receiver 18 affects the spatial hypotheses, such as an aperture 20 generating multiple antenna beams. In addition, range-rate uncertainties affect the number of frequency hypotheses, and timing errors and initial system time uncertainties affect the number of time hypotheses.

Figure 2:
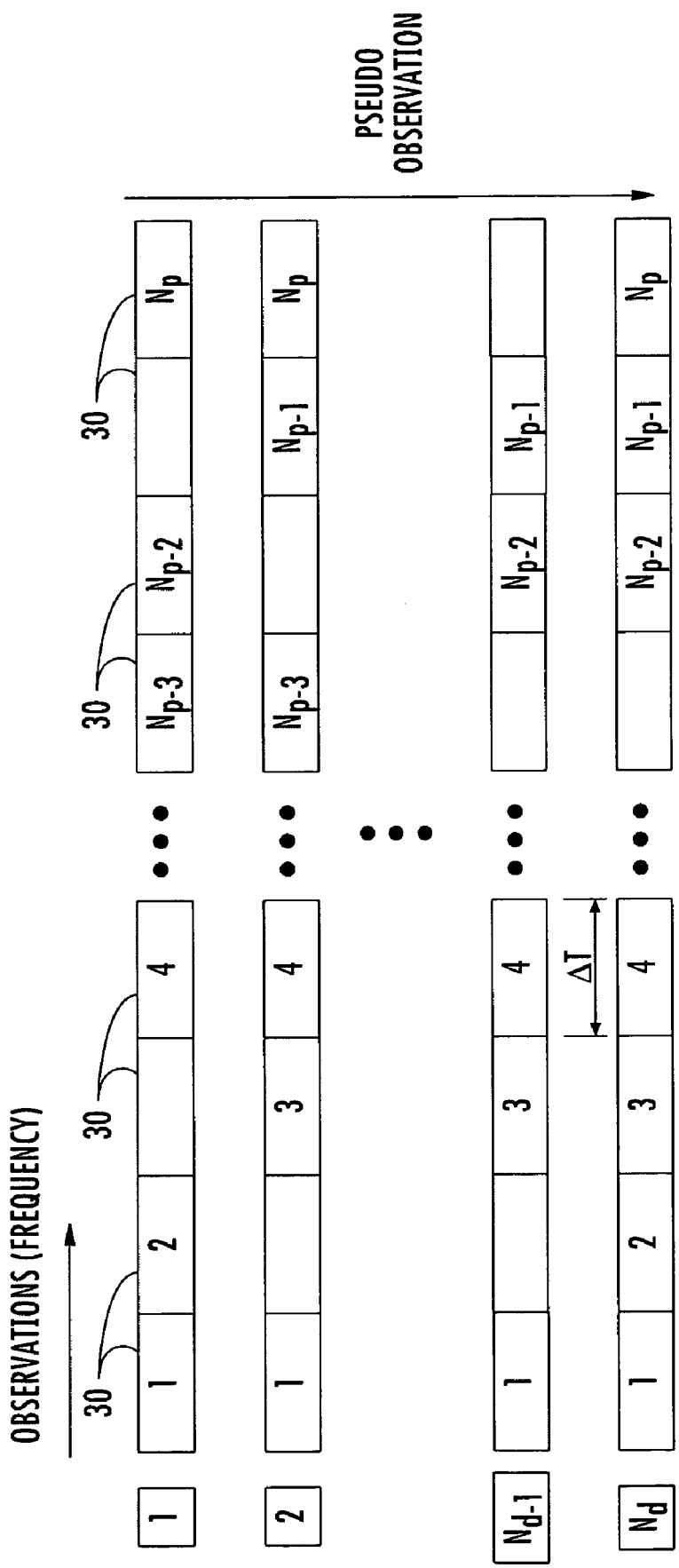
FIG. 2 is a table illustrating a series of data frames forming a pseudo observation in which synch pulses are detected in accordance with the present invention.

To acquire the synch pulses, the receiver 18 dwells on the frequency channel expected to contain a sync hop for a predetermined time period, which is called an observation interval 30. The observation intervals 30 are processed by the receiver 18. The observation intervals 30 are arranged in sequence from 1 to $N_p$, as illustrated in FIG. 2. It is assumed that there is a synch pulse in each observation interval 30, although this may not always be the case. For instance, during scintillation events the signal may fade below detectable levels. In this event the number of dwells is increased to capture enough energy for reliable detection. In organizing the observed data as shown in FIG. 2 the time spacing of the observation intervals is such that a sync hop is potentially accessible in each interval. Thus, in the time-line for synchronization the receiver may need to budget "dead time" between observation intervals because certain sync pulse detection opportunities may be inaccessible due to the "set and dwell" approach as implemented with a single synthesizer and narrowband receiver 18, wherein the front-end of the receiver 18 is set to the expected frequency of the next synch pulse and dwells there based upon a predefined observation.

The observation interval may be within 5 to 25 ms, for example and the setting depends on the particular arrival rate of sync hops. Within each observation interval the individual time indices are labeled to correspond to the time hypotheses. For a 10 ms window, for example, there are nominally about 2500 time hypotheses within a data frame 30. In other words, there are 2500 TOA possibilities of where the synch pulse is within each observation interval 30. Integration by the receiver 18 non-coherently sums the data per time hypotheses indices across all $N_p$ observations to form a single pseudo-observation also containing 2500 values mapped one per TOA hypothesis.

Selection of $N_p$ is impacted by a number of factors. These factors include the following: a fractional sample delay due to an uncertainty in the relative motion (i.e., doppler) between the satellite 10 and the receiver 18 for pseudo-observation integration and binary integration; the signal level needed for detection is terminal and antenna dependent; scintillation conditions, i.e., the fading in and out of the transmitted signals 14; and the number of data pulses that can be handled and their alignment in the uncertainty interval causing false detects.

The value of $N_p$ may be large, such as 500, for example. This would be a good choice for a relatively static transmitter/receiver platforms with weakly received signals. In other cases with high gain antennas, this value may be greatly reduced to 2 or 3 and thus allows greater mobility between the transmitter and receiver platforms. It turns out that the time of uncertainty, in this case 10 ms, divided by the receiver sampling rate is about 2500. As noted above, there are 2500 possible time-of-arrivals for the 1 synch pulse in each observation interval 30. This process is repeated $N_d$ times. The value of $N_d$ is selected large enough to eliminate random occurrences, meaning repetitive or predictable events such as sync hop arrival are favored for detection. For example, $N_d$ may vary between 3 and 10, for example. The value of $N_d$ is impacted by a number of factors such as: the maximum observation time allowable, the number of spatial searches, $N_p$ and detection performance. The total observation time required is (number of spatial scans)*$N_d$*$N_d$*(Observation Interval length) + overhead. Thus, a balance of various system factors is necessary when selecting $N_d$. If the total observation length is too great then the unsynchronized receiver time reference drifts significantly from the transmitter time reference over the observation yielding greatly degraded performance. Typically, the allowable drift is a small fraction of the sync pulse duration. In this design the tolerable drift might be 2 or 3 time hypotheses.

The data processing for time/frequency detection of the synch pulses may be described as comprising five sequential steps. These five steps are matched/orthogonal filtering; non-coherent hop combining (i.e., integration); cascaded detection including ordered-statistic CFAR detection and binary integration; validation of detection; and post processing.

Figure 3:
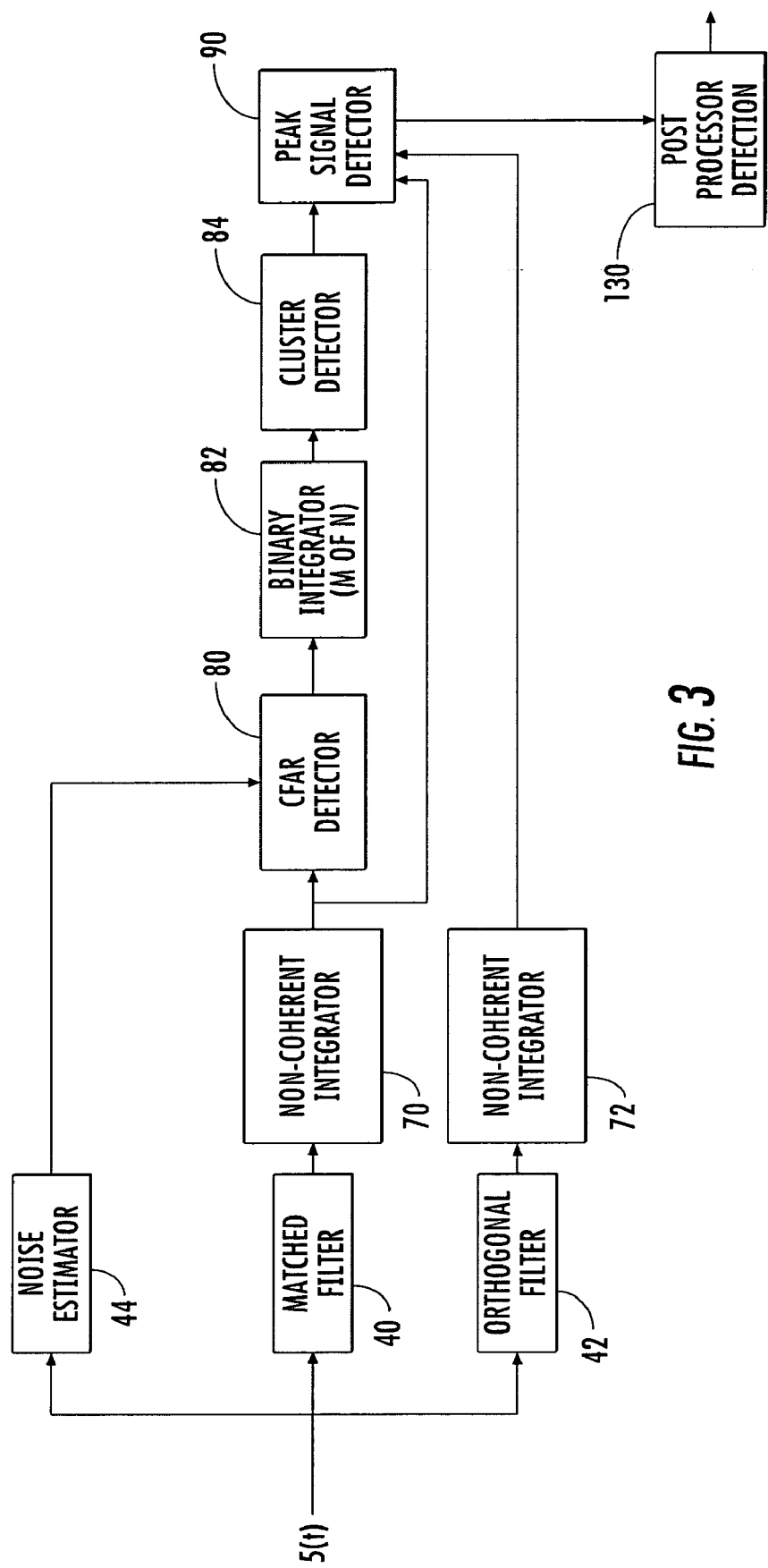
FIG. 3 is a block diagram of the receiver illustrated in FIG. 1.

Referring now to FIG. 3, the receiver 18 will be discussed. The front end of the receiver 18 includes a matched filter 40, an orthogonal filter 42 and a noise power estimator 44 all receiving in parallel the received signal s(t). The matched/orthogonal filtering is intended to maximize the measurement signal-to-noise ratio (SNR) by using a pulse-shape matched filter 40 and a pulse-shape orthogonal filter 42. In ideal (i.e., noiseless) cases, the orthogonal filter 42 provides zero output at the exact time the matched filter 40 is providing maximum output. This action provides a straightforward indicator to exploit for finding the time-of-arrival of a synch pulse.

The matched filter 40 is matched to the known shape of the synch pulses and generates a matched filter output signal comprising a plurality of peaks and valleys with one of the peaks corresponding to the synch pulse within a data frame 30. The orthogonal filter 42 is inversely matched to the synch pulses and generates an orthogonal filter output signal comprising a plurality of peaks and valleys with one of the valleys corresponding to the synch pulse within the data frame 30.

Figure 4A:
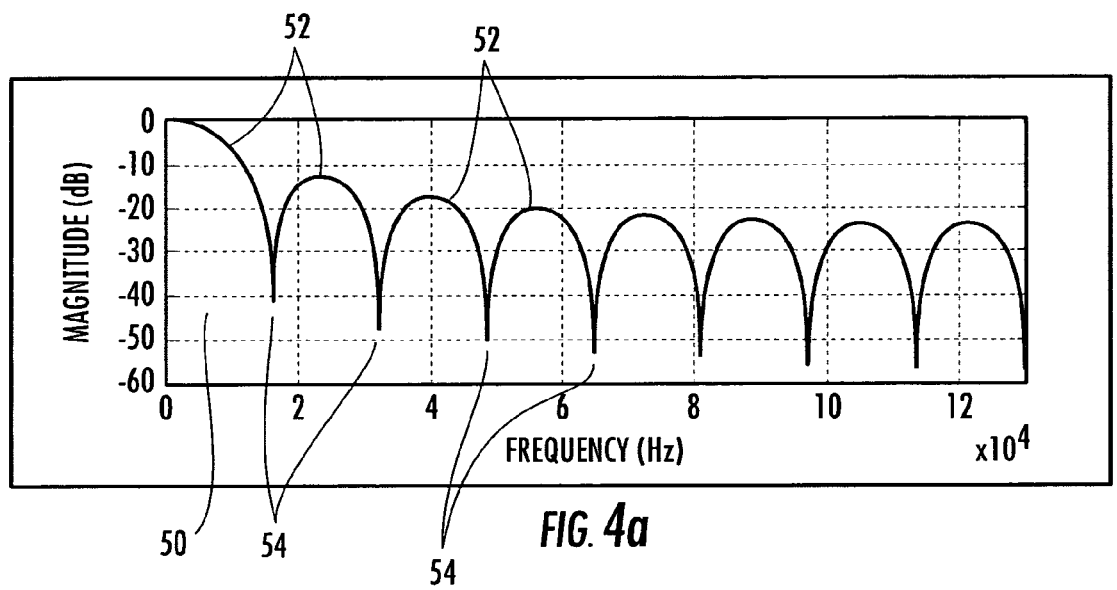
FIGS. 4a and 4b are graphs of frequency domain filter responses from the matched filter and the orthogonal filter illustrated in FIG. 3.
Figure 4B:
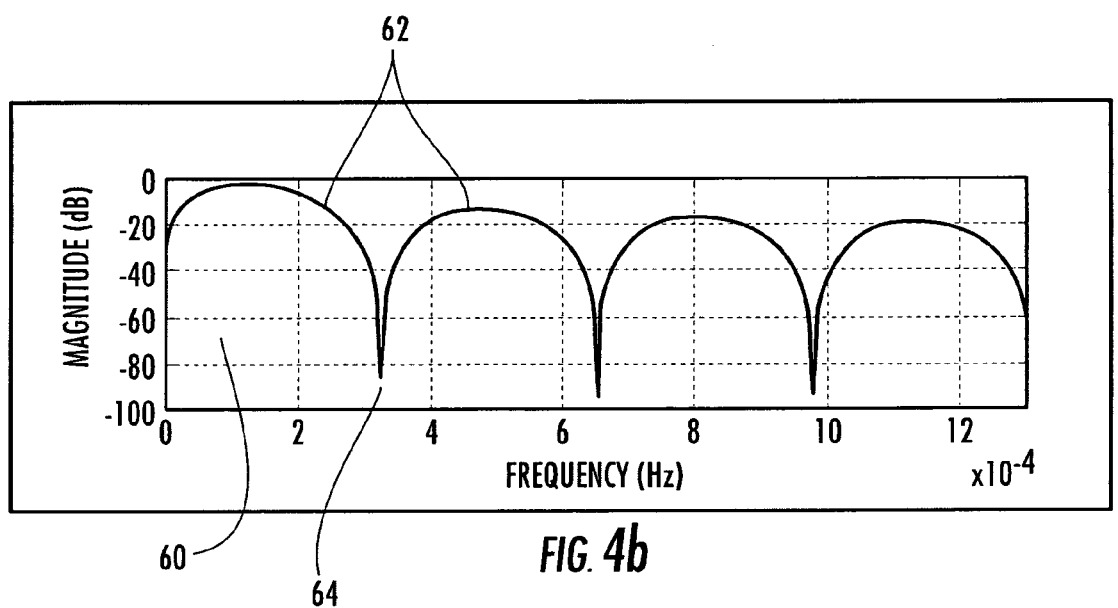

Frequency domain filter responses of the matched filter 40 and the orthogonal filter 42 are illustrated in FIGS. 4a and 4b. These responses are for the specific bipolar sync pulse shaped in this design. The matched filter for other pulse shapes is well-known to those skilled in the art. Also well-known is how to arrive at a filter with an orthogonal response. Line 50 in FIG. 4a represents the frequency response of the matched filter 40, and line 60 in FIG. 4b represents the frequency response of the orthogonal filter 42.

For the orthogonal filter 42, signal 60 is inversely matched to the synch pulses and includes a plurality of peaks 62 and valleys 64 with the valleys corresponding to the synch pulses within the data frame 30. As will be discussed in greater detail below, detection of the synch pulses is based upon a peak difference between the output signals of the matched and orthogonal filters 40, 42 instead of a ratio.

The matched filter 40 is matched to the shape of the synch pulse, and has a filter output signal length of 32 measured in time hypothesis units, for example. In this explanation a single time hypothesis unit can be considered as the discrete time sample period. The 32 samples arise because the input signal is ideally 16 samples, hence requiring a matched filter to also be 16 samples. The time-domain convolution processing of the filter produces the 32-sample output where the peak response occurs at mid-point of the filter response to the matched pulse. The impulse response $h_{mf}(n)$ of the matched filter output signal is matched to the shape of the synch pulse using the well-known time-reversal conjugate property. As noted above, there are nominally about 2500 time hypotheses within a observation interval 30 of 10 ms, for example. Out of the 2500 time hypotheses for each observation interval, a synch pulse therein is to be detected. The filter 40 produces a running convolution of the input signal considering moving blocks of 16 input samples at a time. Hence, the filter processes signal samples 1-16, then 2-17 followed by 3-18 and so on until all 2500 input samples have been processed.

The output signal of the matched filter 40 is input to a non-coherent integrator 70. The non-coherent integrator 70 includes a squaring circuit and a sum circuit, as readily understood by those skilled in the art. Since the input signal s(t) is a complex signal, a real and an imaginary part is generated when this signal is down converted. The squaring circuit is needed because the phase of the output signal from the matched filter 40 is completely random. The squaring function strips out the phase and provides a magnitude squared output value. The summation is by time hypothesis over a pseudo-observation and provides the total energy at each time hypothesis for the collection of $N_p$ observation windows forming one of the $N_d$ pseudo-observations. The squaring and sum circuits thus operate as an energy detector. Essentially, the matched filter 40 is a running correlator in which non-coherently integrated samples are accumulated over $N_p$ data frames.

The orthogonal filter 42 satisfies the discrete time orthogonality relation $h_{MF}^T h_{ORTH}=0$, to provide a response inversely matched to the synch pulses. The output signal of the orthogonal filter 42 is also input to a non-coherent integrator 72, which includes a squaring circuit and a sum circuit. As with the matched filter 40, the output signals from the orthogonal filter 42 are magnitude squared by the squaring circuit for providing the "instantaneous power", and then passed to the sum circuit for providing a discrete time equivalent of integration to accumulate the total energy on a per time hypothesis basis with a pseudo-observation.

The output signal of the orthogonal filter 42 has a zero output corresponding to the optimum sample points of the matched filter 40. The orthogonal filter 42 thus provides a mechanism for determining the center of the arriving synch pulses, as will be discussed in greater detail below. The data pulses are not intentionally matched by the matched and orthogonal filters 40, 42.

The main chain in the detection processing is the matched filter 40, which is matched to the shape of the synch pulse. After the output signal of the matched filter 40 has been non-coherently integrated over a pseudo-observation, the corresponding output is input to a CFAR detector 80.

The constant-false alarm rate (CFAR) detector 80 determines whether the output signal from the non-coherent integrator 70 is a signal plus noise or just noise. The CFAR detector 80 makes an independent decision on each of the 2500 possible time-of-arrivals. The CFAR detector 80 thus collects potential time-of-arrivals of the synch pulses, and reduces the detections per threshold due to noise alone. CFAR is a practical adaptive detection technique useful when the variance under the "null" or "noise only" hypothesis is not know a priori and fixed threshold selections may yield poor performance over the variety of operational conditions the receiver can encounter. To implement a CFAR detection strategy the noise-only variance requires estimation, often in the presence of the signal to be detected.

To assist the CFAR detector 80, the noise estimator 44 is used. One approach to measuring noise-only variance is to hop to an unused frequency and make a noise estimate, but a problem arises when the unused frequency is receiving interference that is different from the frequency of the synch pulses, and hence performance degradation can result.

The noise estimator used in this invention operates as an outlier detector and effectively removes any "signal" plus noise samples from the noise estimation process. These samples can be quite large in magnitude and would unacceptably bias the noise estimate upwards. The key characteristic of the "signal" removal is that there are relatively few "signal" samples (e.g., maybe a few 10's of samples) in each observation interval (e.g., 2500 samples). In principle, rejecting the "signal" samples as outliers will still leave enough remaining samples for a good estimate of the noise only variance. In the current context, "signal" samples are a class formed by both the sync pulse samples and extraneous data hops that may co-incidentally occur in the time/frequency hopped system communicating with other networked terminals. This method also provides the advantage of estimating the noise environment actually incurred on the sequence of frequency channels selected by the receive for detecting the signal.

The outlier rejection method as implemented is a form of order-statistic (OS) processing since any sample value above a threshold is rejected. The OS-CFAR detector 44 in accordance with the present invention advantageously measures simultaneously the input signal s(t) and the noise power surrounding the input signal without allowing the input signal to bias the noise estimate, while the receiver 18 is unsynchronized with the transmitter 12. The OS-CFAR detector 44 operates based upon a two-pass process.

The first pass identifies outliers (i.e., data pulses and synch pulses) from all of the data collected for the $N_d$ pseudo-observations. After the outliers are rejected, the resulting pool of time samples are nominally iid complex Gaussian and the magnitude squared in each pulse is chi-squared with 2 DOF (i.e., exponential), with $m_1=\sigma_1=1$ when normalized to unit power. The noise power estimator is ($\hat{p}_i$) for a "per observation" resulting in $N_p N_d$ noise estimates. The noise level for a pseudo-observation is then formed by summing over $N_p$ values. Thus, the following equation defines the CFAR threshold:

$$\gamma_i = \sum_{i=1}^{N_P}\left(m_1 + \frac{k_T(P_{FA})}{\sqrt{N_P}}\sigma_1\right)\hat{p}_i$$

A per observation approach provides robustness to variations in G/T, jamming, etc. In equation 1, the function $k_T$ is computed from a polynomial. In fact, the CFAR threshold can be completely pre-computed and stored in a table of values. Examples of the first and second passes will now be discussed in greater detail.

The first pass determines the (biased) variance $\sigma^2$ of all samples in an observation interval (i.e., 2500 samples or time hypothesis), and this biased variance is used as a threshold parameter for rejecting any sample exceeding a certain threshold. The threshold is computed as a multiple of the biased variance, in this case the scaling value of 170 was selected. The second pass computes the variance of all surviving samples with instantaneous power values <$170\sigma_{bias}^2$. The factor of 170 may be selected within a range from about 150 to 200, for example. The actual value depends upon the application and the degree to which rejecting actual noise samples is tolerable.

The value of 170 was derived because the biased noise power estimate is computed at the output of the filters and we are operating on the input samples for the rejection processing. Hence, a multiplicative factor of 16 (i.e., the matched filter length) is included in the 170. Also, since noise outliers are not to be rejected since they should contribute to the unbiased measurement of the noise power, a safety factor of approximately 10 to 11 times the variance is selected. Multiplying the matched filter length and safety factor yields an approximate value of 170. For an exponential distribution, the probability of exceeding $10\sigma^2$ is about 1 every 485 million samples. Such a low rejection rate of actual noise samples is assuredly satisfactory.

After the CFAR detector 80 suppresses the random noise events as discussed above, the binary integrator 82 removes more random events, including any large interference pulse signal events. The binary integrator 82 thus helps to reject large interference signals by breaking up the integration interval into $N_d$ sections. As described later the detection of a synch signal will require detection of a particular time hypothesis in M of the $N_d$ pseudo-observations. At the output of the binary integrator 82, a set of time-of-arrivals that has at least M of N hits is provided.

The CFAR detector 80 thus reduces the detections per time hypothesis due to noise alone and also rejects any noise jamming by setting a level-dependent threshold. Since the synch pulses are repetitive and the data pulses are not, M of N detection (i.e., binary integration) is used across all of the pseudo-observations in the binary integrator 82. The integration is thresholded at the level M. Therefore, only thresholds with at least M detects pass through to the next stage. Then, all of the detections are filtered based on some expected features of the synch pulses.

One expected feature of the synch pulses is minimum pulse width. Even low SNR pulses should be at least 3 consecutive thresholds, for example, so a minimum cluster length of 3 is preferably used. The first set of 3 consecutive threshold crossings in the 2500 sample observation interval with at least M detects (i.e., at least M hits in each of 3 consecutive time hypotheses) defines a window to process the non-coherent signal levels. In the window (which is 28 time hypotheses total), the location of the maximum signal level difference between the matched and orthogonal filters 40, 42 with at least M detects is found.

This location should correspond to the optimum sample point of the output signal of the matched filter 40, i.e., a peak correlation point. Due to realistic factors such as data pulses, noise, jammers, and power variations, this is not always the case. With very high probability, about 99%, this selection rule will produce a localized detection of the sync pulse arrival time to within about ± 2 time hypotheses. The difference between the matched and orthogonal filter channels over the window width also tends to avoid detection on the time sidelobes of the matched filter and helps when there are power variations. Without the orthogonal filter channel the time sidelobes and power variations would cause performance degradation. Power variations refer to receiving more power than the minimum case, and not a pulse-pulse variation.

Data pulses can affect the sync pulse detection process. However, including the binary integrator 82 and repeating the collections over some number of pseudo-observations greatly reduces the number of data pulse detection events to deal with. Typically, a 5 of 5 rule (i.e., M=5 and $N_d$=5) for non-scintillation or non-fading cases or a 4 of 5 rule for scintillation cases is chosen to reject the randomly arriving data pulses. In N simulations, when the synch pulses were turned-off after over 100,000 Monte Carlo trials, no data pulses were detected even when typically 2-3 data hops arrive per observation interval. However, at lower rules such as 2 of 5, it becomes much easier (i.e., more possible combinations) for data pulses to occur in a way as to cause detections. Hence, care must be exercised in selecting M not too large with respect to $N_d$ to avoid detecting the signal, and not too small so as to allow data pulses to be detected.

Data pulses are thus also a consideration when selecting the number of observations per pseudo-observation $N_p$. The pseudo-observation $N_p$ sets the processing gain for the synch pulses. Increasing the pseudo-observation $N_p$ allows more data pulses to be collected. Non-coherent integration of the filter output signals effectively timewise adds data pulses together. Data pulses are generally much stronger than the synch pulses, hence relying on integration alone on a single data pulse could prevent proper detection of the synch pulses. The affects of data pulses are mitigated using the $M_d$ of $N_d$ detection approach which exploits the random nature of the data pulses.

An example of an $M_d$ of $N_d$ detection filter process (3 of 4) will be discussed with reference to FIGS. 5a-5e. The integrated and CFAR detected pseudo-observation records have been summed by time hypothesis. FIGS. 5a-5e display the nominally 2500 time hypotheses. The resulting time record is the same length as each individual observation or pseudo-observation. FIGS. 5a-5d show the pre-detection results in each channel (i.e., pre-CFAR). The large signals 102 and 104 are unwanted and the desired detection is signal 100. The resulting post-CFAR detection record summed over $N_d$=4 pseudo-observations is shown in FIG. 5e. Note that using a "success level" (i.e., $M_d$) of about 3, all the unwanted detections are eliminated. In practice, any time hypothesis not achieving at least $M_d$ "detects" in $N_d$ attempts will be assigned 0 or no detect.

Figure 5A:
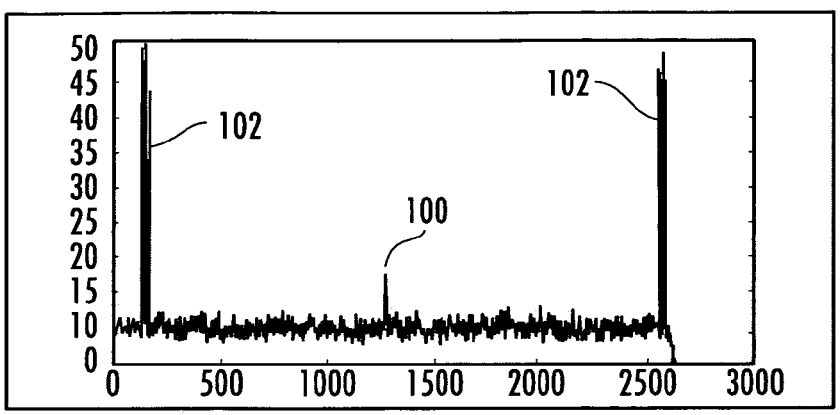
FIGS. 5a through 5e are graphs illustrating an $M_d$ of $N_d$ detector operating as a binary integrator in accordance with the present invention.
Figure 5B:
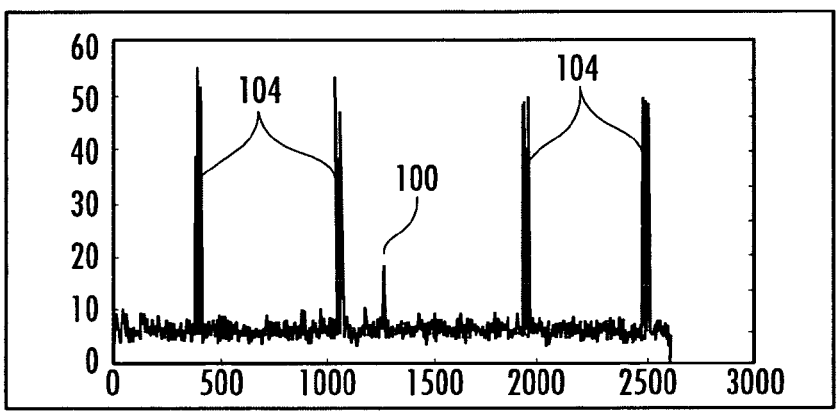
Figure 5C:
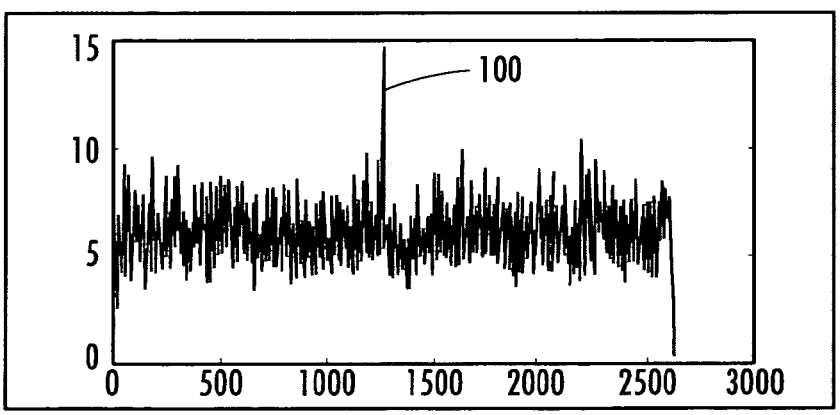
Figure 5D:
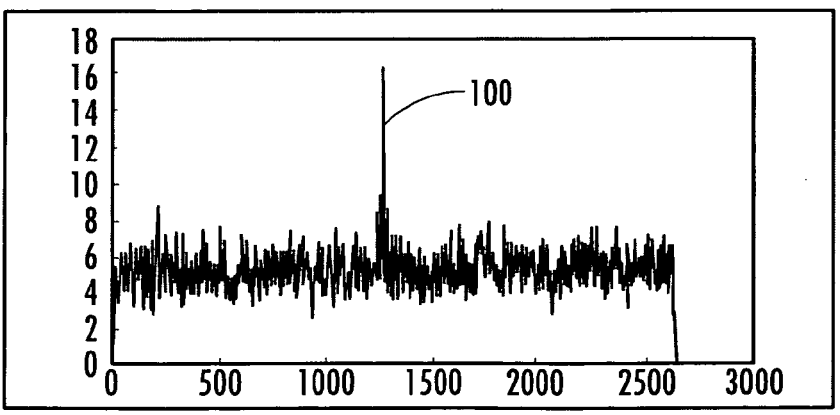
Figure 5E:
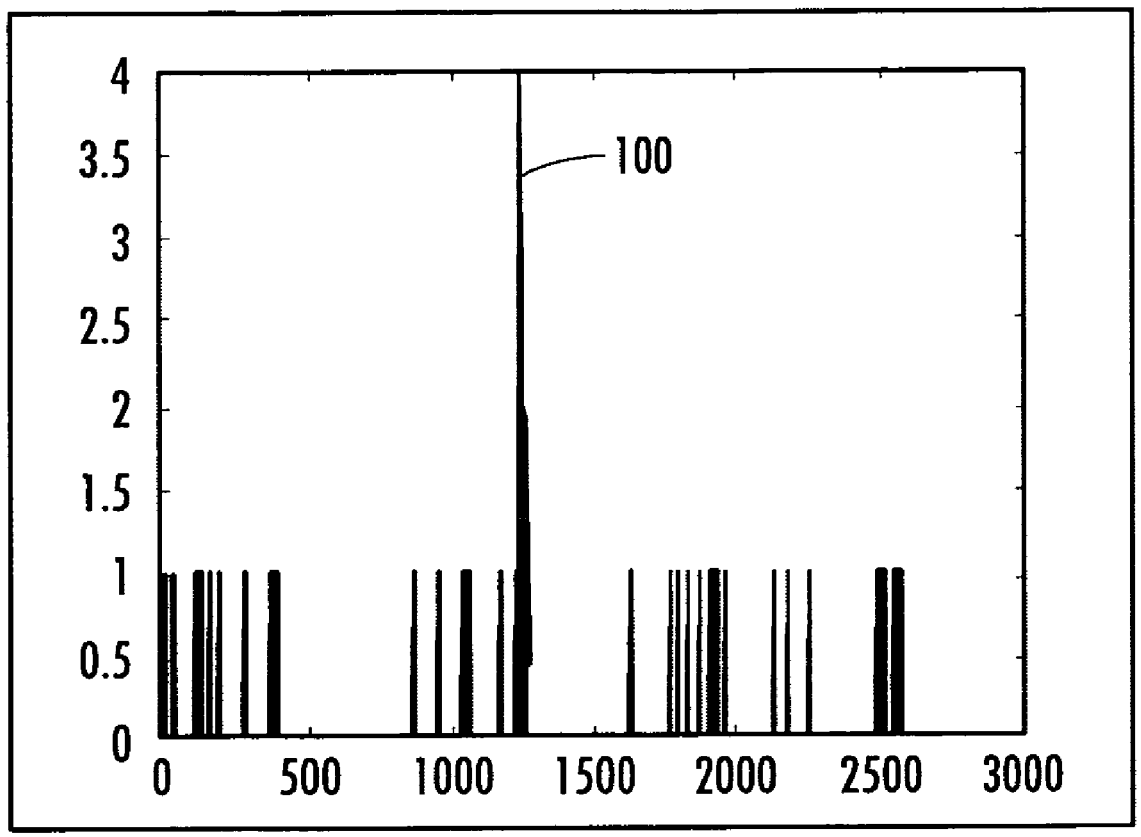

Trial 1 ($N_d$=1) is illustrated in FIG. 5a, and includes a synch pulse 100 and noise spikes 102. Trial 2 is illustrated in FIG. 5b, and includes the synch pulse 100 and also noise spikes 104. The noise spikes 104 may be data pulses, for example. In trials 3 and 4, the synch pulse 100 is mixed in with the noise. The M of N detection results are illustrated in FIG. 5e as a histogram, and the detected synch pulse is represented by spike 100. This operation favors repetitive events and tends to reject randomly occurring events that may have bleed through the CFAR detector 80, such as data pulses, for example.

A time ordered list of detections from the binary integrator 82 is examined by a cluster detector 84. The cluster detector 84 determines if the received input might be too narrow or too wide to be of interest. The cluster detector 84 requires 3 consecutive time hypothesis to be detected M out of N times as a minimum, for example. The cluster detector 84 thus includes a counter, and starts counting from the first detection.

The validation of the detection process essentially now requires validation of the detections from the preceding stages examined for a cluster (i.e., a sequence of consecutive time hypotheses) of an M of N detection of a minimum width (i.e., 3) defining a window around the cluster (i.e., 8/20). Once the window has been defined, the maximum signal level difference between orthogonal and matched filters 40, 42 that has at least $M_d$ hits is determined by a peak detector 90.

The selected time hypothesis is then subjected to a ratio test insuring that the non-coherently integrated matched filter output signal exceeds the non-coherently integrated orthogonal filter output signal by a set factor. Depending on the operational conditions expected, this ratio is selected and is typically in the 4 to 10 dB range, for example. The utility of the acceptance ratio is to further prevent the selection of a time-sidelobe even if it has the maximum signal difference. If a detection is rejected by the acceptance ratio test, a "MISS" is declared.

Figure 6:
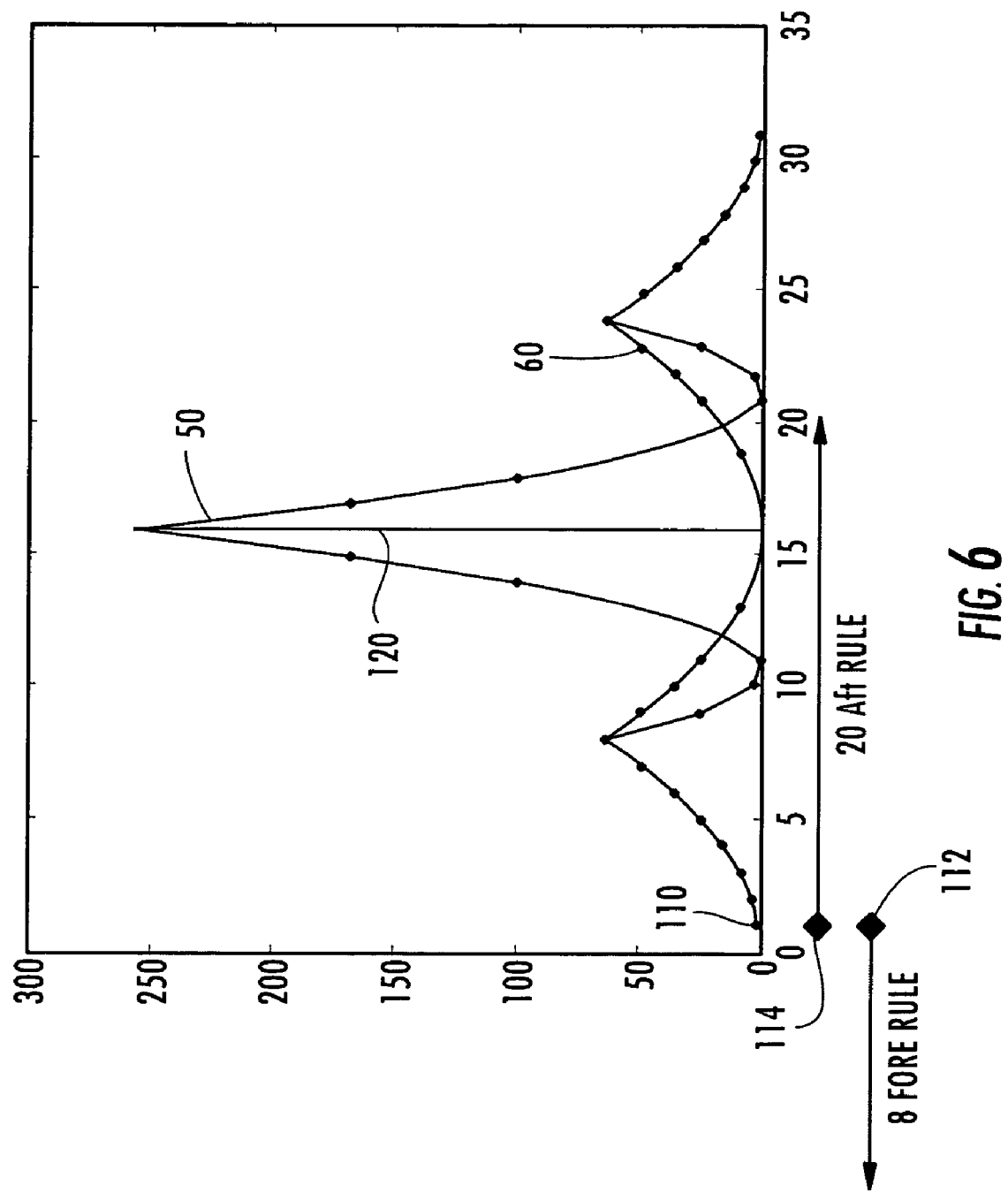
FIG. 6 is a graph of a time domain filter response from the matched filter and the orthogonal filter illustrating the detection process for detecting a synch pulse in accordance with the present invention.

In terms of cluster validation, a cluster is "opened" on the first instance of 3 consecutive time hypotheses passing the M of N test, as indicated by reference numeral 110 in FIG. 6. Then a window 112 of 8 indices before the first cluster time index 110 and a window 114 of 20 after the first cluster time index is defined. Over this window the point where the signal difference 120 between the matched filter integrated output signal and orthogonal filter integrated output signal is maximum is searched by the peak detector 90.

The window was introduced to account for the fact that power variations in each scenario (e.g., long-term weather effects, beam coverage, etc.) can cause a variety of cluster patterns around the desired detection point. Instead of using a myriad of cluster sorting algorithms, a simple window approach covers all cases of interest. Also, the 8 fore part of the rule 112 addresses the potential to miss the main lobe and detect on the back lobe. While the 20 aft rule 114 addresses a cluster starting on the very front of the front lobe.

The point with the maximum signal difference 120 that has at least $M_d$ detects is selected by the peak detector 90 to compute the time-of-arrival. The difference rule helps reject time sidelobes of the matched filter output signal and tends to locate the center of the synch pulse. Because a cluster is opened, there is at least one point satisfying the $M_d$ hit criteria. If multiple points satisfy the maximum signal level criteria and each has at least $M_d$ hits, the earliest point in the window is chosen and the others are rejected as possible detections.

However, the detection point can be other places depending on various error instances. At times, a data pulse extends into the front portion of the synch pulse detection and the combination of the synch pulse and the data pulse pass the M of N rule for some time index. To force the detection algorithm to miss this, any detection is subjected to a ratio test after the difference test. This means that not only should the difference be a maximum over the interval, but the difference should also exceed a certain ratio. Not exceeding the ratio results in the detection being declared a "miss". The ratio is obtained from a parameter table, which typically includes a few different values covering all operational cases considered by the system designer.

In summary, the first cluster 110 of the threshold detects conforming to at least the minimum width (i.e., at least 3 consecutive thresholds) is used. The maximum signal level difference is found between matched and orthogonal filter processing strings with at least $M_d$ detects identifying the threshold within the 8/20 window. The difference helps in the rejection of the time sidelobes of the matched filter output signal. To account for various power levels and detection statistics the 8-20 rule is used. The cluster maximum signal level difference with at least $M_d$ detects is ratio tested (in dB) to reject data pulses.

The post-detection processing is performed by a processor 130 connected to an output of the peak detector 90. After demodulation, there may be several different types of time-frequency detection patterns. The time axis is indexed by time hypotheses and the frequency axis is indexed by a scenario dependent number of frequency hypotheses. The frequency hypotheses arise because for best performance the system is canalized into several channels to attempt to maintain matched filters over the expected Doppler frequency offsets caused by relative transmitter and receiver motion. If left uncompensated, the matched and orthogonal filter responses are no longer optimal for the incoming signal and performance greatly suffers. The present invention works well with overlapping frequency channels set at 6 KHz centers. Because of the assumed worst case motion dynamics of polar satellites and ship-based receivers (for example) up to 7 frequency channels are allotted. In the present implementation the collected data is buffered and frequency translated effectively forming the individual frequency channels. Each frequency channel uses the same processing steps discussed above.

The processor 130 operates based upon rules for arbitrating detections. The processor considers all the detections over time and frequency and reports a single time/frequency hypothesis as the detection. Typically, the frequency reported is the band center value.

Only under the case of adjacent frequency and close time detections is the frequency being centroided. The centroid is based on the signal levels detected in each time/frequency bin considered in the detection. This gives a sub-bin resolution to the detection process, which is an advantage over straight channelization. The earliest time hypothesis participating in the centroid, regardless of frequency band, is picked as the time of arrival since the time error would be small anyway.

However, when there is a gap in frequency or time of detections, the T-F bin with the largest signal level is the correct one. It is possible that other bins may be detected as T-F sidelobes of the mismatched matched filter. Depending on the severity of the mismatch, detections could occur in a large window. Defining a window in the 16-24 threshold region worked well in avoiding "bad" detections by simply choosing the earliest threshold. However, for safety, the value 32 threshold is chosen. This post-processing window defines a span from the earliest time hypothesis detection in any channel to the latest possible time hypothesis in any other frequency channel acceptable for detection.

This window value in part affects the minimum location a high power follower-jammer 22 may be with respect to the receiver 18. This is because the follower-jammer 22 will be high power and producing signals "spoofing" the desired one and in this post-processing window the jammer would be the largest signal and cause an "incorrect" Time-Frequency bin to be selected. The result is the receiver not syncing to the transmitter which was the overall goal.

The 32 time-hypothesis post-processing window is different than the 8/20 rule. The 8/20 is applied to select a detection in the demodulation for a particular channel being processed. The 32 threshold rule is applied post-processing across all channels to select the ultimate detection reported.

If necessary, the relative motion between the satellite 10 and the receiver 18 can be compensated. This compensation is provided in the receiver 18 prior to the input signal s(t) being processed. This type of compensation is based upon an ephemeris processor, wherein the satellite contains and periodically transmits ephemeris data about its own orbit and clock, or the orbit is know a priori with sufficient accuracy using standard techniques.

As an example, compensation would be needed in the relative motion if the ground-based receiver 18 is instead on a ship that was pitching and rolling in rough waters. The errors introduced by the range and range-rate uncertainties with respect to the ship and the satellite 10 need to be compensated. In addition, Doppler compensation is used to remove the frequency offset induced by the range-rate. The ephemeris processor produces an estimated range-rate of the satellite 10 and ship translation motion.

In some applications, antenna blockage may be a problem. In this case, say two antennas are connected to the receiver 18. With two unblocked antennas, the decisions by the receiver 18 in a spatial hypothesis are extremely likely to match. The decisions are typically not independent due to correlated interference, i.e., data pulses. On a given spatial hypothesis both antennas make the same decision (i.e., correct detect, miss or false detect) based on realization of the data and synch pulses. False detections due to noise are nearly immeasurable. To provide the redundancy, the antennas are spatially locked-step together to scan the field of regard. The concept is that each antenna is a redundant system for detection given the input signal because the main contaminating signals are not independent but highly correlated, i.e., the data pulses.

The lock-step approach is used so the antennas attempt detection in the same point of the sky at the same time. If at least one antenna remains unblocked for a time sufficient to collect the data to permit reliable detection (e.g., typically <1-2 sec), then either antenna can be used for receiving the synch pulses (i.e. hard handover or redundant system). In this way, either antenna (or both) can finish the acquisition process. Also, one antenna could be continually blocked and hence never participate in the acquisition process.

The assumption saying that at least one antenna is not blocked at any given time is not necessary, but it is sufficient for the proposed process to operate. Satisfying the assumption means that both antennas cannot simultaneously remain blocked for long periods (i.e., missing multiple collect opportunities defined by a time of $N_P * N_d * T_{CSH}$). The necessary condition is that at least one aperture can complete the necessary data collection to detect the signal on a regular basis.

The regular basis begins often enough that the timeline margin is sufficient to absorb any collections that are aborted by an aperture being blocked. The timeline margin is set by operational considerations in relation to system performance. Any collection interval where an aperture becomes blocked is canceled from reporting any detections for that collection of pseudo-observations. If all the apertures are blocked, then all detections are ignored. As soon as one of the antennas is unblocked, collections are restarted.

Many modifications and other embodiments of the invention will come to the mind of one skilled in the art having the benefit of the teachings presented in the foregoing descriptions and the associated drawings. In addition, other features relating to sync pulse detection is disclosed in copending patent application filed concurrently herewith and assigned to the assignee of the present invention and is entitled RECEIVER INCLUDING FALSE ALARM REJECTION PROCESSING AND ASSOCIATED METHODS, attorney work docket number GCSD-1700 (51433). Therefore, it is to be understood that the invention is not to be limited to the specific embodiments disclosed, and that modifications and embodiments are intended to be included within the scope of the appended claims.

That which is claimed is:

1. A receiver comprising:
   a matched filter being matched to a synch pulse and generating a matched filter output signal comprising a plurality of peaks and valleys with one of the peaks corresponding to the synch pulse;
   an orthogonal filter being inversely matched to the synch pulse and generating an orthogonal filter output signal comprising a plurality of peaks and valleys with one of the valleys corresponding to the synch pulse; and
   a detector for determining the synch pulse based upon the matched filter output signal and the orthogonal filter output signal.

2. A receiver according to claim 1 wherein said detector detects the synch pulse based upon a largest difference between the matched filter output signal and the orthogonal filter output signal.

3. A receiver according to claim 1 wherein the synch pulse comprises a frequency hopped synch pulse.

4. A receiver according to claim 1 wherein said matched filter and said orthogonal filter have inputs coupled in parallel for receiving an input signal comprising a plurality of data pulses and a plurality of synch pulses.

5. A receiver according to claim 4 wherein the input signal comprises $N_p$ observation intervals, with $N_p$ being equal to or greater than 1, and further comprising:
   a first non-coherent integrator coupled to an output of said matched filter for non-coherently integrating samples accumulated by said matched filter over the $N_p$ observation intervals; and
   a second non-coherent integrator coupled to an output of said orthogonal filter for non-coherently integrating samples accumulated by said orthogonal filter over the $N_p$ observation intervals.

6. A receiver according to claim 5 further comprising a constant false alarm rate (CFAR) detector coupled to an output of said first non-coherent integrator for comparing the non-coherently integrated samples accumulated by said matched filter over the $N_p$ observation intervals to a noise threshold.

7. A receiver according to claim 6 further comprising a noise estimator coupled to said CFAR detector for setting the noise threshold based upon the input signal.

8. A receiver according to claim 7 wherein said noise estimator comprises an ordered-statistic CFAR detector and sets the noise threshold for the $N_p$ observation intervals by
   determining a first variance of the plurality of synch and data pulses within the $N_p$ data frames, and removing pulses exceeding a first variance threshold; and
   determining a second variance on the plurality of synch and data pulses not exceeding the first variance threshold, and removing pulses exceeding a second variance threshold;
   the noise threshold being set based upon a remaining input signal for the $N_p$ observation intervals after removal of pulses exceeding the first and second variance thresholds.

9. A receiver according to claim 1 wherein the receiver comprises an asynchronous receiver.

10. A receiver comprising:
    an input for receiving an input signal comprising a plurality of data pulses and a plurality of synch pulses;
    a matched filter coupled to the input and being matched to the plurality of synch pulses and generating a plurality of matched filter output signals, at least one of the matched filter output signals comprising a plurality of peaks and valleys with one of the peaks corresponding to one of the synch pulses;
    a constant false alarm rate (CFAR) detector coupled to an output of said matched filter for comparing each matched filter output signal to a noise threshold so that data pulses exceeding the noise threshold are removed;
    an orthogonal filter coupled to the input and being inversely matched to the plurality of synch pulses and generating a plurality of orthogonal filter output signals, at least one of the orthogonal filter output signals comprising a plurality of peaks and valleys with one of the valleys corresponding to one of the synch pulses; and
    a detector coupled to an output of said CFAR detector and to an output of said orthogonal filter for determining the plurality of synch pulses based upon the respective matched and orthogonal filter output signals.

11. A receiver according to claim 10 wherein said detector detects the plurality of synch pulses based upon the matched filter output signals and the orthogonal filter output signals.

12. A receiver according to claim 10 wherein the input signal comprises a frequency hopped input signal.

13. A receiver according to claim 10 wherein the input signal is divided into $N_p$ data frames, with $N_p$ being equal to or greater than 1, and further comprising:
    a first non-coherent integrator coupled between said matched filter and said CFAR detector for non-coherently integrating samples accumulated by said matched filter over the $N_p$ observation intervals; and
    a second non-coherent integrator coupled between said orthogonal filter and said detector for non-coherently integrating samples accumulated by said orthogonal filter over the $N_p$ observation intervals.

14. A receiver according to claim 13 wherein said CFAR detector compares the non-coherently integrated samples accumulated by said matched filter over the $N_p$ observation intervals to the noise threshold.

15. A receiver according to claim 10 further comprising a noise estimator coupled between the input and said CFAR detector for setting the noise threshold based upon the input signal.

16. A receiver according to claim 15 wherein the input signal is divided into $N_p$ observation intervals, with $N_p$ being equal to or greater than 1; and wherein said noise estimator comprises an ordered-statistic CFAR detector and sets the noise threshold for the $N_p$ observation intervals by
    determining a first variance of the plurality of synch and data pulses within the $N_p$ data frames, and removing any pulse exceeding a first variance threshold; and
    determining a second variance on the plurality of synch and data pulses not exceeding the first variance threshold, and removing any pulse exceeding a second variance threshold;

the noise threshold being set based upon the remaining input signal for the $N_p$ observation intervals after removal of pulses exceeding the first and second variance thresholds.

17. A receiver according to claim 10 wherein the receiver comprises an asynchronous receiver.

18. A method for detecting a synch pulse in a receiver comprising a matched filter matched to the synch pulse and an orthogonal filter inversely matched to the synch pulse, the method comprising:
   generating a matched filter output signal comprising a plurality of peaks and valleys with one of the peaks corresponding to the synch pulse;
   generating an orthogonal filter output signal comprising a plurality of peaks and valleys with one of the valleys corresponding to the synch pulse; and
   determining the synch pulse based upon the matched filter output signal and the orthogonal filter output signal.

19. A method according to claim 18 wherein the detector detects the synch pulse based upon a largest difference between the matched filter output signal and the orthogonal filter output signal.

20. A method according to claim 18 wherein the input signal comprises $N_p$ observation intervals, with $N_p$ being equal to or greater than 1, and further comprising:
   non-coherently integrating samples accumulated by the matched filter over the $N_p$ observation intervals using a first non-coherent integrator coupled to an output of the matched filter; and
   non-coherently integrating samples accumulated by the orthogonal filter over the $N_p$ observation intervals using a second non-coherent integrator coupled to an output of the orthogonal filter.

21. A method according to claim 20 further comprising comparing the non-coherently integrated samples accumulated by the matched filter over the $N_p$ data frames to a noise threshold using a constant false alarm rate (CFAR) detector coupled to an output of the first non-coherent integrator.

22. A method according to claim 21 further comprising setting the noise threshold based upon the input signal using a noise estimator coupled to the CFAR detector.

23. A method according to claim 22 wherein the noise estimator comprises an ordered-statistic CFAR detector and sets the noise threshold for the $N_p$ observation intervals by
   determining a first variance of the plurality of synch and data pulses within the $N_p$ observation intervals, and removing any pulse exceeding a first variance threshold; and
   determining a second variance on the plurality of synch and data pulses not exceeding the first variance threshold, and removing any pulse exceeding a second variance threshold;
   the noise threshold being set based upon a remaining input signal for the $N_p$ observation intervals after removal of pulses exceeding the first and second variance thresholds.

* * * * *